US008954551B2

(12) United States Patent  
Royt

(10) Patent No.: US 8,954,551 B2  
(45) Date of Patent: Feb. 10, 2015

(54) VIRTUALIZATION OF GROUPS OF DEVICES

(75) Inventor: Sergey Royt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 973 days.

(21) Appl. No.: 12/050,142

(22) Filed: Mar. 17, 2008

(65) Prior Publication Data

US 2009/0235174 A1  Sep. 17, 2009

(51) Int. Cl.  
*G06F 15/173* (2006.01)  
*H04L 29/08* (2006.01)  
*G06F 3/06* (2006.01)  
*H04L 12/24* (2006.01)  
*H04L 12/26* (2006.01)

(52) U.S. Cl.  
CPC .......... *H04L 67/1097* (2013.01); *G06F 3/0613* (2013.01); *G06F 3/0635* (2013.01); *G06F 3/067* (2013.01); *H04L 41/0893* (2013.01); *H04L 67/16* (2013.01); *G06F 2206/1012* (2013.01); *H04L 12/2602* (2013.01); *H04L 41/12* (2013.01); *H04L 43/00* (2013.01)  
USPC ........... 709/223; 709/224; 709/226; 709/227; 709/228

(58) Field of Classification Search  
CPC .............. H04L 29/06; H04L 29/08981; H04L 29/08171; H04L 29/0809; H04L 29/08576; H04L 41/22  
USPC .......................... 709/223, 224, 226, 227, 228  
See application file for complete search history.

(56) References Cited

U.S. PATENT DOCUMENTS

| 5,274,643 | A | * | 12/1993 | Fisk ............................. 370/238 |
| 6,543,392 | B1 | * | 4/2003 | Ashton et al. ................. 122/392 |
| 6,898,705 | B2 | | 5/2005 | Abboud et al. |
| 7,783,856 | B2 | * | 8/2010 | Hashimoto et al. ........... 711/173 |
| 2003/0212716 | A1 | | 11/2003 | Steele et al. |
| 2005/0120160 | A1 | * | 6/2005 | Plouffe et al. ..................... 711/1 |
| 2005/0198235 | A1 | | 9/2005 | Kumar et al. |
| 2005/0220080 | A1 | * | 10/2005 | Ronkainen et al. ........... 370/352 |
| 2005/0270986 | A1 | * | 12/2005 | Watanabe et al. ............. 370/252 |
| 2006/0010176 | A1 | | 1/2006 | Armington |
| 2006/0089995 | A1 | * | 4/2006 | Kerr et al. ..................... 709/227 |
| 2006/0107087 | A1 | | 5/2006 | Sieroka et al. |
| 2006/0184653 | A1 | | 8/2006 | van Riel |

(Continued)

OTHER PUBLICATIONS

Babcock, "VMware Upgrades Physical-To-Virtual Migration Tool", Information Week, Jan. 30, 2007, pp. 1-2.

(Continued)

*Primary Examiner* — Rupal Dharia  
*Assistant Examiner* — Van Kim T Nguyen  
(74) *Attorney, Agent, or Firm* — Jim Sfekas; Kate Drakos; Micky Minhas

(57) ABSTRACT

A virtualization mechanism may create a virtual representation of a group of physical computers and the physical connections between the computers. The mechanism may comprise a discovery tool for determining a topology of connected physical computers and selecting the elements to virtualize, a device virtualization tool that may create virtual versions of the physical computers, and a connection virtualization tool that may create virtual connections between the virtual computers. The virtual devices and virtual connections may then be operated virtually. In many cases, optimized versions of the virtual devices and virtual connections may be performed.

17 Claims, 5 Drawing Sheets

100  
EXAMPLE OF VIRTUAL REPRESENTATION WITH OPTIMIZATION

(56) References Cited

U.S. PATENT DOCUMENTS

| | | |
|---|---|---|
| 2007/0027973 A1 | 2/2007 | Stein et al. |
| 2007/0100977 A1 | 5/2007 | Barry |
| 2007/0250608 A1 | 10/2007 | Watt |
| 2007/0260721 A1* | 11/2007 | Bose et al. .................... 709/223 |
| 2009/0049161 A1* | 2/2009 | Takeuchi et al. .............. 709/222 |

OTHER PUBLICATIONS

Seldam, "Virtual Machine Remote Control Plus", Microsoft Corporation, 2007, pp. 1-5.

Sapuntzakis, et al., "Optimizing the Migration of Virtual Computers", Proceedings of the 5th Symposium on Operating Systems Design and Implementation, Dec. 2002, pp. 14.

* cited by examiner

VIRTUALIZATION OF GROUPS OF DEVICES

BACKGROUND

Virtualizing technologies are techniques and mechanisms by which computers, including the operating system, may be implemented in software. When an entire computer system including the operating system is implemented in software, the unit may be referred to as a virtual machine.

Virtual machines may be used in many situations, for example, where each virtual machine performs a specific function or component of a larger service, but the components are executed in separate virtual machines to avoid conflicts or problems between the components. In such an example, multiple components may be executed on a single hardware platform or may be spread across multiple hardware platforms to handle different levels of demand.

SUMMARY

A virtualization mechanism may create a virtual representation of a group of physical computers and the physical connections between the computers. The mechanism may comprise a discovery tool for determining a topology of connected physical computers and selecting the elements to virtualize, a device virtualization tool that may create virtual versions of the physical computers, and a connection virtualization tool that may create virtual connections between the virtual computers. The virtual devices and virtual connections may then be operated virtually. In many cases, optimized versions of the virtual devices and virtual connections may be performed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
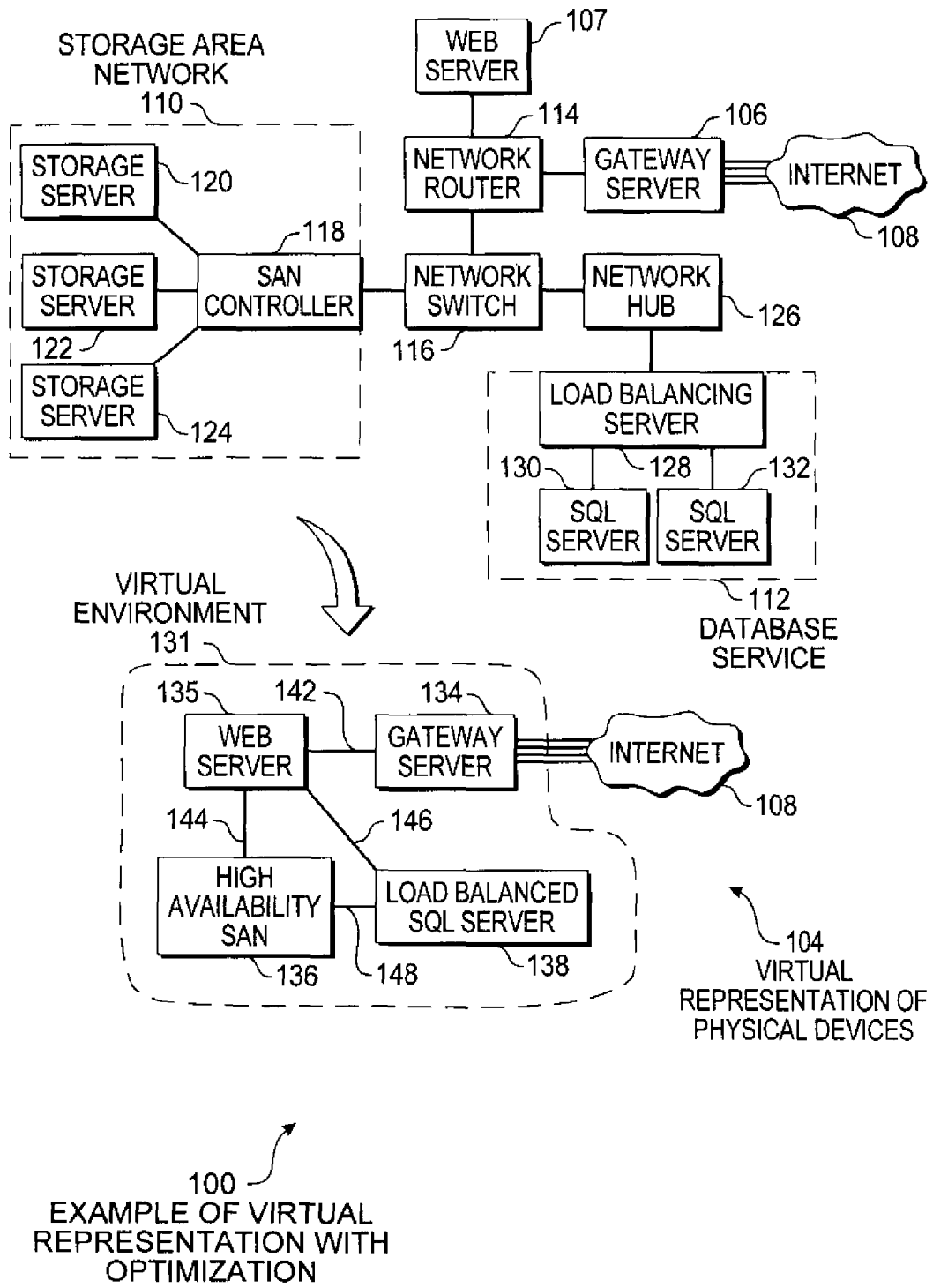
FIG. 1 is a diagram illustration of an embodiment showing an example of a transformation from a group of connected physical devices to a virtual representation of the devices.

A group of physical computers with physical connections may be represented as virtual computers with virtual connections. Each physical computer may be analyzed and converted to a virtual computer and then each physical connection may also be identified, analyzed, and converted to virtual connections between the virtual computers. The connected group of computers may be operated in a virtual environment.

The virtualized group of interacting computers may be used to represent and execute the functions of an interconnected group of physical computers in a virtual manner. In many cases, a group of physical computers may be virtualized so that the group may be operated on a larger, faster hardware platform. In other cases, a group of physical computers may be virtualized and consolidated onto a single hardware platform.

When a group of interacting computers is virtualized, an optimization step may optimize the virtualized versions of one or more computers as well as optimizing the communication paths or connections between the computers. The optimization may include, for example, replacing a group computer systems with a single virtual device that performs the same function. In another example, physical connections that route through multiple switches, hubs, routers, or have complex network connections may be consolidated into a single link connection.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an example 100 showing a before and after configuration of a physical group of computers that may be virtualized as a group. Example 100 is merely an example of a transformation from physical computer devices and complex connections to a virtual version that may be, in some cases, optimized.

In example 100, a physical layout 102 of a group of interconnected devices may be analyzed, optimized, and converted to a virtual representation 104 of the group of devices. In some embodiments, the group of physical devices may be replicated without optimization, while in other embodiments, subsets of devices may be optimized and/or the connections between devices may be optimized. In embodiment 200 illustrated in FIG. 2 later in this specification, a mechanism for performing the conversion from a physical layout to a virtual configuration is illustrated.

Virtualization offers many useful opportunities. In some instances, a virtual version of a connected group of computers may enable an administrator to move the group of computers to different hardware platforms, to expand and contract the capabilities of the group, and to isolate the group from other computer devices or services.

Virtualization may be used in test environments where a group of computers may be run under various test conditions and subjected to different scenarios. When virtualized, multiple sets of connected computers may be easily created and operated in parallel, thus allowing many tests to be performed in parallel.

In many embodiments, virtualization may enable two or more physical devices to be represented and executed on a single hardware platform. One hardware platform may execute many virtual machines, each of which may be operated in a virtual environment that is isolated from the other virtual machines.

When two or more physical devices are converted to virtual machines and operated on a single hardware platform, the communications between the virtual machines may be much faster than when the physical devices communicate over a network. In many cases, network connections may be shared by many devices and available network bandwidth and communication travel time between devices may vary.

Groups of connected physical devices may be converted to virtual machines and operated on different hardware platforms. In such cases, the virtual machines may be operated on faster hardware platforms for increased capabilities, and the connections between the virtual devices may also be optimized for increased throughput.

By identifying and virtualizing groups of physical computers by creating virtual representations of the computers and their connections, complex systems may be virtualized in a single operation. Further, portions of the system may be optimized during the virtualization transition.

In many cases, groups of computers may operate together to perform various functions. In the example 100, the illustrated group of computers may perform a web hosting service. Other groups of computers may be arranged for load balancing purposes, high uptime, or for other purposes.

For example, a load balancing arrangement may comprise a load balancing or distribution server and several servers that may process requests. The load balancing server may receive a request, determine which of the servers are available to service the request, and assign one of the servers to process the request. In such a configuration, the group of computers may have a topology and function that enables the group of computers to service more requests than a single server.

When converting a load balancing group of physical servers to a virtual environment, the group may be virtualized and the connections between the servers may be replicated in the virtual environment. In such a case, the virtual environment may include a virtual load balancing server and several virtual servers.

In some cases, a load balancing group of physical servers may be converted to a single virtual server that may process requests. In some such cases, the load balancing group of servers may be older hardware platforms that may be much slower than a newer hardware platform which may host the virtual version of the group. The newer hardware platform may be capable of providing as much or more throughput or improved response time than the previous group of physical servers by executing a single virtual server without the load balancing arrangement.

In another example, a group of computers may be arranged in a high uptime arrangement. In a high uptime arrangement, redundant devices may be arranged so that if one device fails, the other device may be operable to respond. In some cases, such arrangements may be configured so that a high level of service is maintained, while in other arrangements, the devices may be configured to continue responding although with a lower response time or throughput.

During a virtualization process, connections between devices may be analyzed and optimized. For example, a connection between two servers may be made through various network switches, routers, gateways, hubs, or other network components. In some cases, a particular network component may use specific protocols or may convert from one protocol to another as traffic is passed across the component. Such connections, when discovered and re-created in a virtual environment, may be optimized to remove extraneous connections or components.

In many cases, a physical network may be constrained by the physical locations of different servers, the available network capacity within portions of the network, the presence and operation of other physical devices, and many other factors. When converting from a physical environment to a virtual environment, many of such factors may be removed and thus some connections and configurations may be optimized or changed.

In some cases, a virtual version of a group of physical devices may be created to duplicate specific problems or to troubleshoot specific areas of the network. In such a case, a virtual version of the connections may be created with as much similarity as possible with the physical version.

In the example 100, a physical layout 102 may represent the computer systems that make up a website. A gateway server 106 may provide various firewall, routing, and other functions between the Internet 108 and a web server 107. The web server 107 may serve web pages and respond to requests from clients connected to the Internet 108.

The gateway server 106 may be connected to the web server 107 through a network router 114. The network router 114 may be a specialized network device that may route and forward communications between several devices.

The web server 107 may communicate with a storage area network 110 and a database service 112 to serve various web pages. The storage area network 110 may be a system or group of devices configured to store and retrieve data for the web server 107 or for the database service 112.

The web server 107 may be connected to the storage area network through the network router 114 and a network switch 116. Similarly, the web server 107 may be connected to the database service 112 through the network router 114, the network switch 116, and a network hub 126.

Each network component such as the network router 114, network switch 116, and network hub 126 may provide some connectivity between various devices. In some cases, the network component may merely receive a packet and transmit the packet along the network. An example may be a network hub 126. In other cases, the network component may receive a packet, analyze routing information attached to the packet, and forward the packet to a specific device connected to the network component. An example may be a network switch 116. In other cases, such as the network router 114, communication packets may be analyzed, routed, and in some cases wrapped or unwrapped using various protocols.

In a physical network, the various network components may be arranged for connecting various other physical devices together. For example, many devices not shown may be connected to the network using the network router 114, network switch 116, and network hub 126. The example 100 may illustrate those devices and connections that make up a web service that may be virtualized while leaving off many other devices that may be connected using a network.

The connections between the components of the web service in the physical layout 102 may contribute to some performance issues. In general, communications that are made across several devices generally add time delay and bandwidth restrictions to the communication. For example, a request from the web server 107 to the database service 112 may go through three network components, each of which may add some delay in the communication.

In many cases, a subgroup of physical devices may be used to provide a single service or function. For example, the storage area network 110 may comprise a storage area network (SAN) controller 118 and several storage servers 120, 122, and 124. The SAN controller 118 may provide request routing, load balancing, replication, high uptime, redundancy, and other functions across the several storage servers. In many embodiments the SAN controller 118 may communicate with the storage servers 120, 122, and 124 through a high speed SAN backbone or network that is separate from the network connecting the web server 107 and the storage area network 110.

As a subgroup, the SAN controller 118 and the storage servers 120, 122, and 124 may operate as a single unit that may receive read and write requests and transmit responses.

Similarly, the database service 112 may comprise a load balancing server 128 and database or SQL servers 130 and 132. As a subgroup, the database service 112 may be configured as a load balancing or high throughput configuration.

When the virtual representation 104 of the physical layout 102 is created, a virtual representation of each device or group of devices as well as the connections between the devices may be created. The virtual environment 131 may operate each of the various virtual devices along with the connections between the devices. The virtual environment 131 may be hosted on a single hardware platform, or may span several hardware platforms. Each hardware platform may have an operating system or other executable code in which a virtual machine may be executed. In some embodiments, a hypervisor or other management component may be used to manage and operate the various virtual devices.

When the physical layout 102 is converted to operate in the virtual environment 131, the gateway server 134 and web server 135 may be created as separate virtual devices that correspond to the gateway server 106 and web server 107 in the physical layout 102.

In many cases, a virtual representation of a physical device may be created by creating a software version of the hardware and software components on the physical device, and then transferring the data, configuration files, or other information from the physical device to the virtual device. The virtual device may then be operated within a virtual environment and may perform the same functions in a similar manner as the original physical device.

When the virtual gateway server 134 and virtual web server 135 are created, a virtual connection 142 may be created. The virtual connection 142 may represent the connection between the physical gateway sever 106, the network router 114, and the physical web server 107. When the virtual connection 142 is created, the original physical connection may be combined and optimized into a single connection 142. In some cases, a physical connection may have various protocols, filters, and other functional characteristics. When such a physical connection is moved to a virtual environment, some or all of such characteristics may be implemented in the virtual connection. In some cases, such functional characteristics may be removed to achieve higher performance in the virtual environment.

When the storage area network 110 is converted to the virtual representation 104, the storage area network 110 may be optimized, combined, or otherwise represented as a high availability SAN 136. The SAN 136 may represent the functional aspects of the SAN controller 118 along with the storage servers 120,122, and 124 in a single virtual machine. The SAN 136 may be, in some cases, a virtual machine with high availability or high performance characteristics that may be similar to the physical storage area network 110.

Similarly, the load balanced SQL server 138 may be an optimized version of the database service 112 that contains a load balancing server 128 and SQL servers 130 and 132.

The connections 144, 146, and 148 may be optimized virtual representations of the connections between the corresponding physical devices.

Example 100 is one example that may illustrate a conversion of a connected group of physical devices to a virtual representation of those devices. In some cases, a conversion may replicate many physical details, including the various network components. In other cases, optimization may be performed on such connections.

Figure 2:
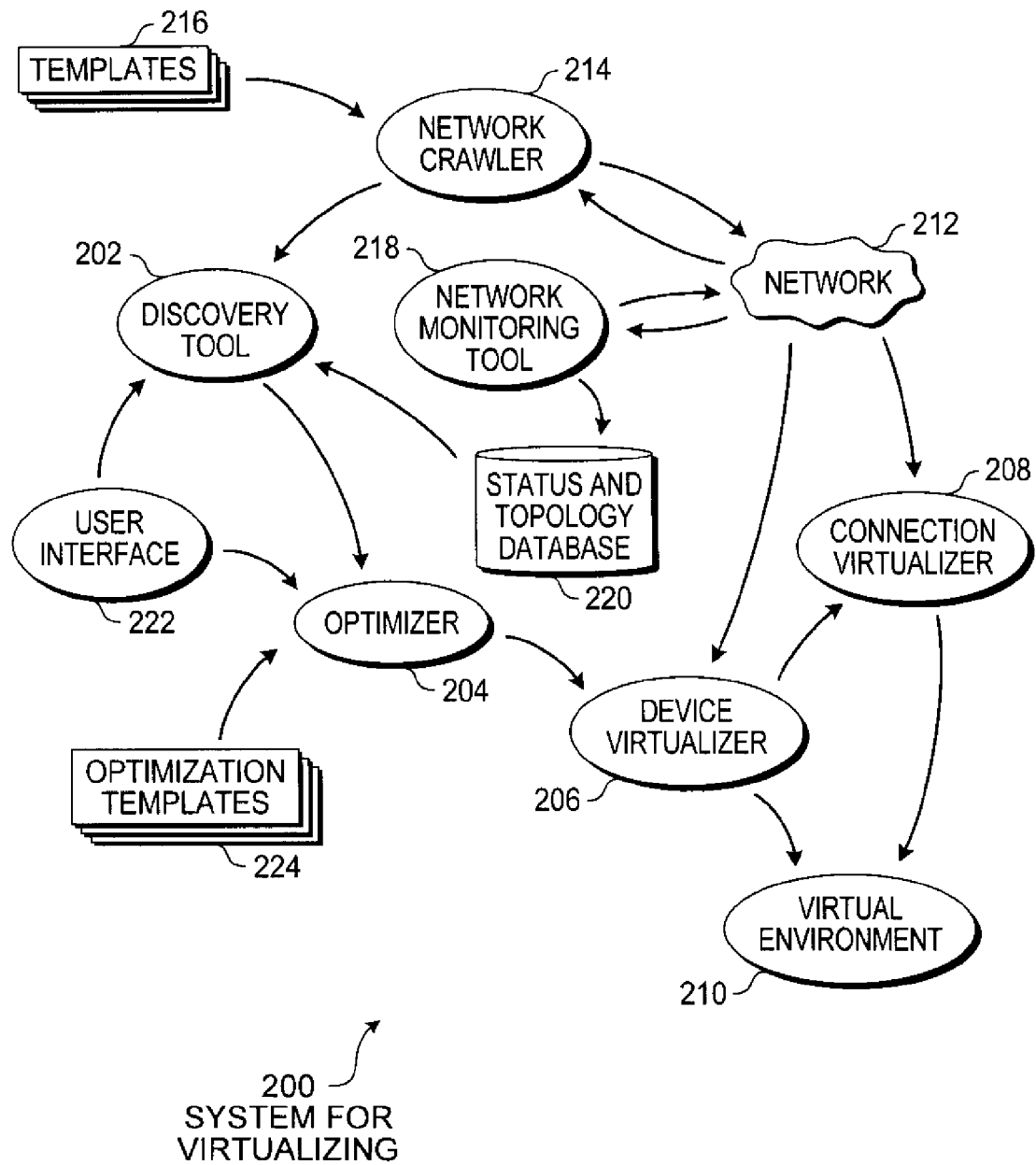
FIG. 2 is a diagram illustration of an embodiment showing a system for virtualizing a connected group of physical devices.

FIG. 2 is a functional illustration of an embodiment 200 showing a system for virtualizing. Embodiment 200 illustrates one embodiment of a system for creating a virtual representation of a group of physical devices by showing various functional elements that may make up a system.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a system that may discover, optimize, and implement a set of virtual machines with connections between the virtual machines. The set of virtual machines may represent various functional aspects of a group of physical devices with physical connections between the devices.

A discovery tool 202 may be used to discover and identify the physical devices and connections that may be virtualized. An optimizer 204 may analyze and optimize the physical configuration. The device virtualizer 206 may create virtual machines that represent physical machines or groups of physical machines. The connection virtualizer 208 may create connections between the various virtual devices. The virtual machines and connections may be executed in a virtual environment 210.

The system of embodiment 200 may be used to create virtual representations of various physical computer devices. In many cases, a group of computer devices may be configured to provide various services. Many web services, line of business applications, and organization-wide application or storage systems may be delivered by groups of computers that are arranged to perform individual functions for the application or service. In the example 100, one server was dedicated as a web server while another device or group of devices were dedicated to perform database services.

The discovery tool 202 may discover physical devices as well as the connections between the devices, and may do so using many different techniques, mechanisms, and sources of metadata about the devices and connections between the devices.

In some embodiments, a network crawler 214 may be used to detect physical devices and their connections. The network crawler 214 may start with a specific device and may query the device, instrument the device, or use some other technique to determine various aspects of the device. In many embodiments, certain metadata may be readily available, such as the operating system, executing applications, and various hardware characteristics of a device. In some cases, the network crawler 214 may instrument the device to monitor incoming and outgoing messages to identify other devices and to collect metadata about the connections and traffic with the other devices.

Some embodiments of a network crawler 214 may use templates 216 that may identify a typical configuration of various services. The templates 216 may contain typical configurations of devices and connections that may be used to perform various services. For example, a storage area network may have a template that may be used by the network crawler when a storage area network is identified. The template may be used to guide the network crawler 214 to look for specific types of devices and connections between those devices.

Many enterprise computing environments may contain a network monitoring tool 218 that may continually monitor devices on the network 212 and keep a status and topology database 220. In some such systems, various servers, network devices, and client devices on a network may be instrumented with an agent or other monitoring system. The monitoring system may collect performance, status, and configuration information for devices on the network.

The status and topology database 220 may be used by a discover tool 202 to collect some or all of the metadata about devices and connections on the network 212. In some embodiments, metadata from the network crawler 214 may be used in conjunction with the status and topology database 220 to determine information about the devices and connections on the network 212.

Many embodiments may include a user interface 222. The user interface 222 may be used by an administrator or other user to identify which devices and connections between devices are to be virtualized. In some cases, the user interface 222 may be used to identify a starting device that may be used by a network crawler 214 to find related devices and connections between the devices.

In some embodiments, the user interface 222 may be used to define the groups of devices and connections between the devices that may be converted to virtual versions of those devices and connections. Some conversions may be performed where a group of devices are virtualized and one or more physical devices remain without virtualizing. Such a conversion may be a hybrid where a group of devices are partially virtualized while keeping the connections between the functional components of the multi-device system.

The user interface 222 may be used to display a graphical representation of a topology of devices and the connections between them. From the graphical representation, a user may be able to identify the specific devices to virtualize and which devices are to remain as non-virtualized physical devices.

The user interface 222 may also be used to indicate to an optimizer 204 what types of optimization changes may be performed when moving from a physical version to a virtual version of a device or group of devices.

The optimizer 204 may automatically, manually, or with manual assistance identify and optimize various devices, connections between devices, and groups of devices. In some embodiments, the optimizer 204 may use a set of optimization templates 224 to identify a group of devices that may be consolidated into one virtual device. In some cases, a single physical device that performs two or more different tasks may be represented as two or more virtual machines, with each virtual machine performing one of the tasks.

The optimization templates 224 may be used to consolidate various configurations of devices into an optimized virtual version of those devices. The templates may contain a framework for a physical group of devices and an optimized virtual version that may be used in place of the physical group. For example, the storage area network 110 in example 100 was consolidated into a virtual high availability SAN 136 device. The optimization templates 224 may include various options for configuring virtual versions of individual or groups of devices.

The optimizer 204 may analyze various discovered devices and connections between the devices and may present options to a user for the conversion from physical devices to virtual devices. The optimizer 204 may perform an analysis and determine two or three options for a virtual configuration of a group or subgroup of devices, and a user may select from between the options to determine a virtual representation of the physical devices.

For example, the optimizer 204 may create several options for the database service 112 in the example 100. One option may be to create a virtual copy of the load balancing server 128 and each of the SQL servers 130 and 132. Another option may be to create a virtual load balanced SQL server 138 that may have similar or better performance than the original, physical database service 112. Other options may include creating virtual versions of SQL servers 130 and 132 but leaving the load balancing server 128 as a physical device.

When the optimizer 204 has finished analyzing and processing the topology, a definition of the desired virtual configuration may be passed to the device virtualizer 206 and the connection virtualizer 208. The device virtualizer 206 may create a virtual version of each of the physical devices or groups of physical devices identified by the discovery tool 202 and optimized by the optimization tool 204. Similarly, the connection virtualizer 208 may create virtual connections between the virtual devices to emulate the connections discovered in the physical network 212.

The virtual devices and virtual connections may be operated in a virtual environment 210. The virtual environment 210 may be a virtual environment contained on a single physical host device or may include many physical host devices.

The system of embodiment 200 may be used to create virtual versions of groups of devices. In many cases, the discovery tool 202 may be used to discover and display many physical devices and connections between the devices in the network 212. From those physical devices, a group may be selected for conversion to virtual versions of those physical devices and the connections between the devices.

Figure 3:
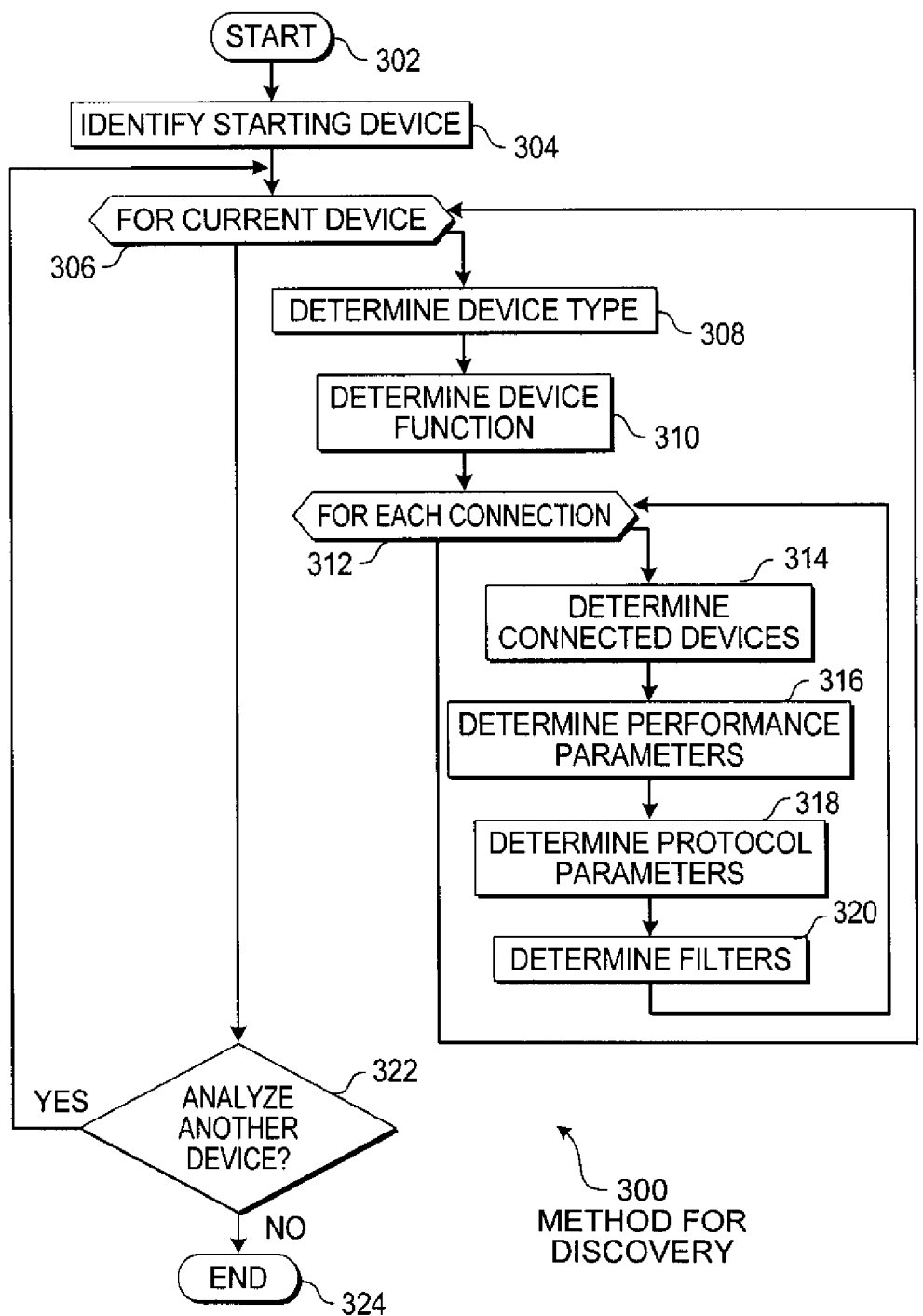
FIG. 3 is a flowchart illustration of an embodiment showing a method for discovering a connected group of physical devices.

FIG. 3 is a flowchart illustration of an embodiment 300 showing a method for discovery. Such a method may be used automatically, manually, or partially automatically to define physical devices and physical connections between the devices. The definition may be used by an optimization routine or may be used by a virtualization routine to create virtual versions of the physical devices.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is an example of a simplified sequence for crawling a network. In many embodiments, different techniques may be used to determine the presence and metadata of physical devices and connections within a network. Such other embodiments may use data derived from a monitoring application, user supplied descriptions or identification of the devices and connections, or any other input mechanism.

The discovery method starts in block 302.

A starting device is identified in block 304. The starting device may be identified by a user or may be selected automatically. Some embodiments may display a graphical depiction of a network arrangement and a user may select one of the devices. In some cases, such an embodiment may enable a user to select all of the devices to virtualize. In such embodiments, the crawling process may be used to determine various metadata and characteristics of the devices and connections that may be virtualized.

For the current device in block 306, various metadata may be derived or discovered for the device and any connections to the device. The method of embodiment 300 may be used to collect information that may be the basis for creating corresponding virtual devices and virtual connections.

The device type may be determined in block 308, and a device function may be determined in block 310. The device type may be any description that may be used to create a virtual device and perform various optimizations. In some embodiments, the device type may be broad types of devices, such as a server device, a network connection device, a client device, or other type. Some embodiments may describe a device type as a specific type of hardware configuration with specific types of processors, a certain amount of random access memory, specific peripheral devices, an amount of data storage, and other hardware characteristics.

The device function in block 310 may be related to the type of software or other functional characteristics of the device. For example, a device may execute data storage functions, serve web pages, respond to database queries, perform firewall functions, balance loads across servers, operate a specific function as part of a larger application, or provide many other functions. Some crawlers may determine the function of a device by inspecting the operating software on the device and the processing time devoted to various functions performed by the device.

For each connection on the device in block 312, various connection parameters and characteristics may be collected.

The devices that communicate on the connection may be determined in block 314. In many embodiments, the connected devices may be used to determine a destination for a crawler. Each connected device may be analyzed to determine the characteristics of those devices.

Performance parameters may be determined in block 316, protocol parameters may be determined in block 318, and any filters may also be determined in block 320. Many connections may have various performance parameters such as bandwidth and network speed. Some connections may operate using specific protocols or filters, such as TCP/IP protocol or other protocols and filters. Such protocols and filters may be used by software or hardware components on the transmitting or receiving ends of the communication. In some embodiments, the protocols and filters may be used by an intermediary network device such as a router, gateway, or other device to permit communication between communicating devices.

Once metadata are collected for the device, if another device is to be analyzed in block 322, the other device is made current and the process may return to block 306, otherwise the process may end in block 324.

The embodiment 300 may collect some or all of the information that may be used for optimization and virtualization of a group of devices and connections between the devices. In some cases, the embodiment 300 may be used to collect information that may be used to identify and select those devices to virtualize, but much of the information used to virtualize may be collected during the virtualization process.

Figure 4:
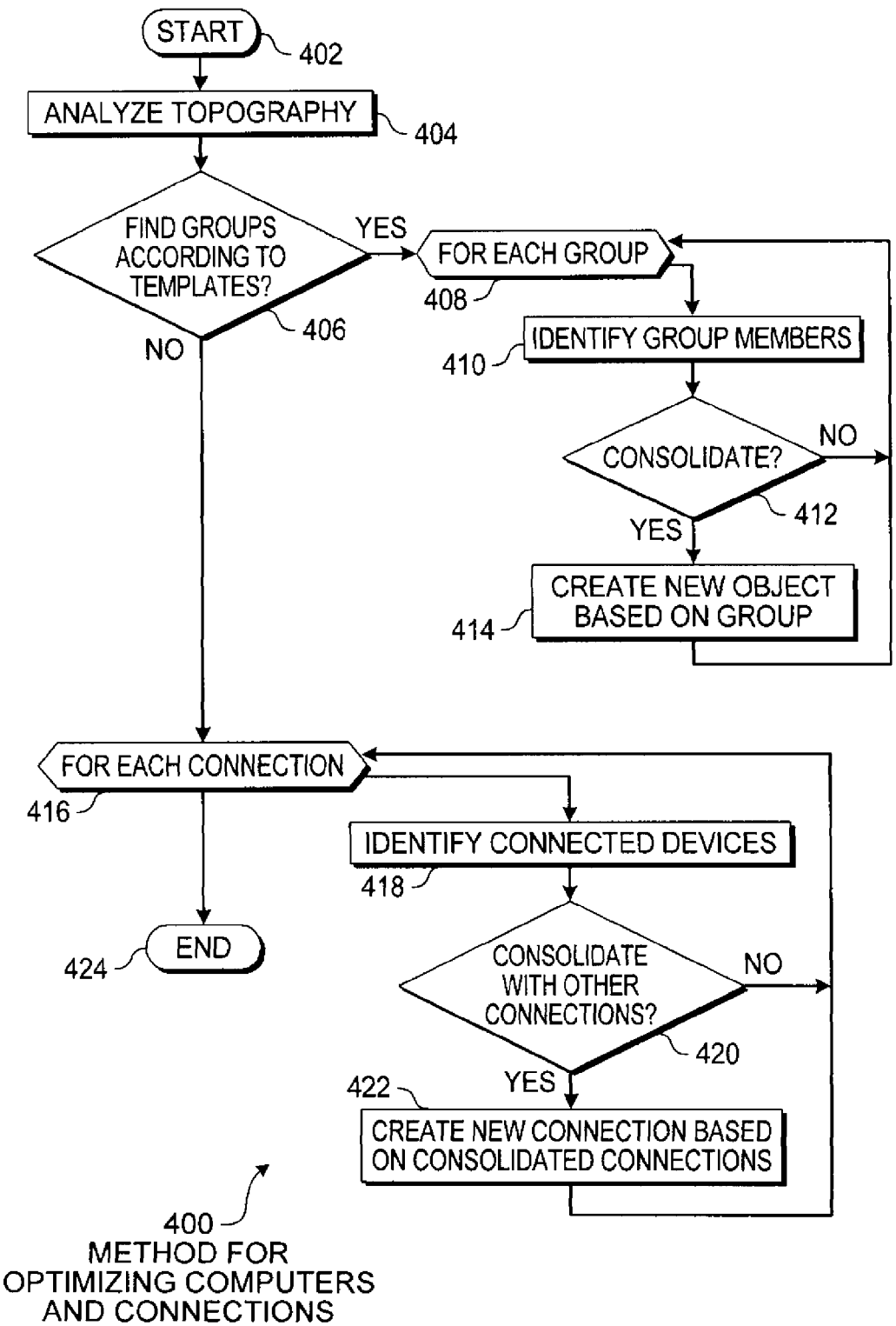
FIG. 4 is a flowchart illustration of an embodiment showing a method for optimizing a virtual version of a connected group of physical devices.

FIG. 4 is a flowchart illustration of an embodiment 400 showing a method for optimizing computers and connections that may be performed prior to virtualizing the devices and connections. Such a method may be used automatically, manually, or partially automatically to define changes between the physical topology and virtual topology of a group of connected devices.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is a simplified example of one method for optimizing a virtual version of a group of connected devices. In many embodiments, an optimization method may involve an iterative process and may have many options for a user to select an appropriate type of optimization based on the goals of the virtualization procedure.

Embodiment 400 may be a fully automated procedure, or may be manually performed. In some embodiments, portions of the embodiment 400 may be performed automatically while others may be performed with by a user or with a user intervention. Embodiment 400 is a general, high level overview process by which a virtual version of a group of connected devices may be configured, changed, and optimized.

The term 'optimize', as used in this specification, refers to making changes between a physical version of a device or connection and a virtual version of the device and connection. In many cases, an optimization procedure may improve one or more aspects of the virtual configuration over the physical configuration, but some changes or 'optimizations' may not improve any aspects. The optimization procedure may merely change some aspect of a group of devices when creating a virtual version of a physical group of connected devices. In many cases, however, extensive optimization or changes may be performed to improve various performance or other characteristics.

The embodiment 400 may begin in block 402.

In block 404, the topology of the discovered physical devices and connections may be analyzed. In some embodiments, such analysis may be performed automatically. One method for such analysis is to use a set of templates for various configurations to determine if the configurations exist in the physical group of connected devices. If there is a match, the template may contain one or more suggested virtual configurations that may represent the physical arrangement.

In some embodiments, the topology of the physical devices may be analyzed by a user. In many cases, a user may have knowledge about the intent or other factors used to design the physical system that may be used to select devices and connections to optimize.

For each group of devices to optimize in block 408, the group members are identified in block 410. If the group of devices may be consolidated in block 412, a new object may be created based on the group of physical devices. In some cases, an automated analysis tool may identify the group of devices. In other cases, a user may manually identify the devices and their connections.

In many embodiments, the decision whether to consolidate in block 412 may be made by a user with a user interface. In some embodiments, the decision to consolidate may be automatically determined.

An example of the consolidation of a group of connected devices into a new virtual object may be the consolidation of the storage area network 110 in example 100 to a virtual high availability SAN 136.

The consolidation of a group of connected objects into a new virtual object may remove a level of complexity that may be desired in the physical version but not desired in the virtual version. For example, a complex system of a load balancing database service 112 may be desired when the SQL servers 130 and 132 are older, slower hardware platforms that respond to more requests than a single server may handle. In a virtual environment, the load balanced SQL server 138 may operate on a much faster, higher capacity hardware platform where the performance is dramatically better. The level of complexity for a load balancing server 128 and the connections between the load balancing server 128 and the SQL servers 130 and 132 may be removed in the virtual version.

For each connection in block 416, an optimization may be performed as well. In many physical connections, devices may be connected by two or more intermediate network devices or other complexities. By optimizing the virtual connections between devices, such complexities may be removed and thus the virtual connections may be more streamlined and may have improved performance.

The connected devices may be identified in block 418. When the connected devices are identified in block 418, the connections between the devices may also be identified. For example, a the connection between the gateway server 106 and the web server 107 in example 100 consisted of a connection between the gateway server 106 and the network router 114 and a connection between the network router 114 and the web server 107.

If the connections are to be consolidated in block 420, a new connection based on the consolidated connections may be created in block 422. In the example above, the connection between the gateway server 106 and the web server 107 was consolidated into the virtual connection 142.

The optimization process may end in block 424.

In many embodiments, the optimization process may result in a definition of a group of virtual devices and virtual connections between the devices. The connected group of virtual devices may be based on the connected group of physical devices. In some cases, the connected group of virtual devices may correspond very highly with the connected group of physical devices. In other cases where large amounts of optimization may be performed, the connected group of virtual devices may be a highly simplified form of the physical devices.

In some embodiments, an optimization procedure may create two or more virtual devices or connections that may represent a single physical device or connection. For example, a physical server device may have several applications or perform several functions. In an 'optimized' virtual version of the physical server, several virtual devices may be created with each virtual device performing one of the functions of the physical device.

After defining the characteristics of the physical devices and connections in embodiment 300, any changes to the physical devices and connections may be made through an optimization process in embodiment 400. This may result in a definition of a virtual group of connected devices. In embodiment 500, the virtual devices and connections may be created and executed.

Figure 5:
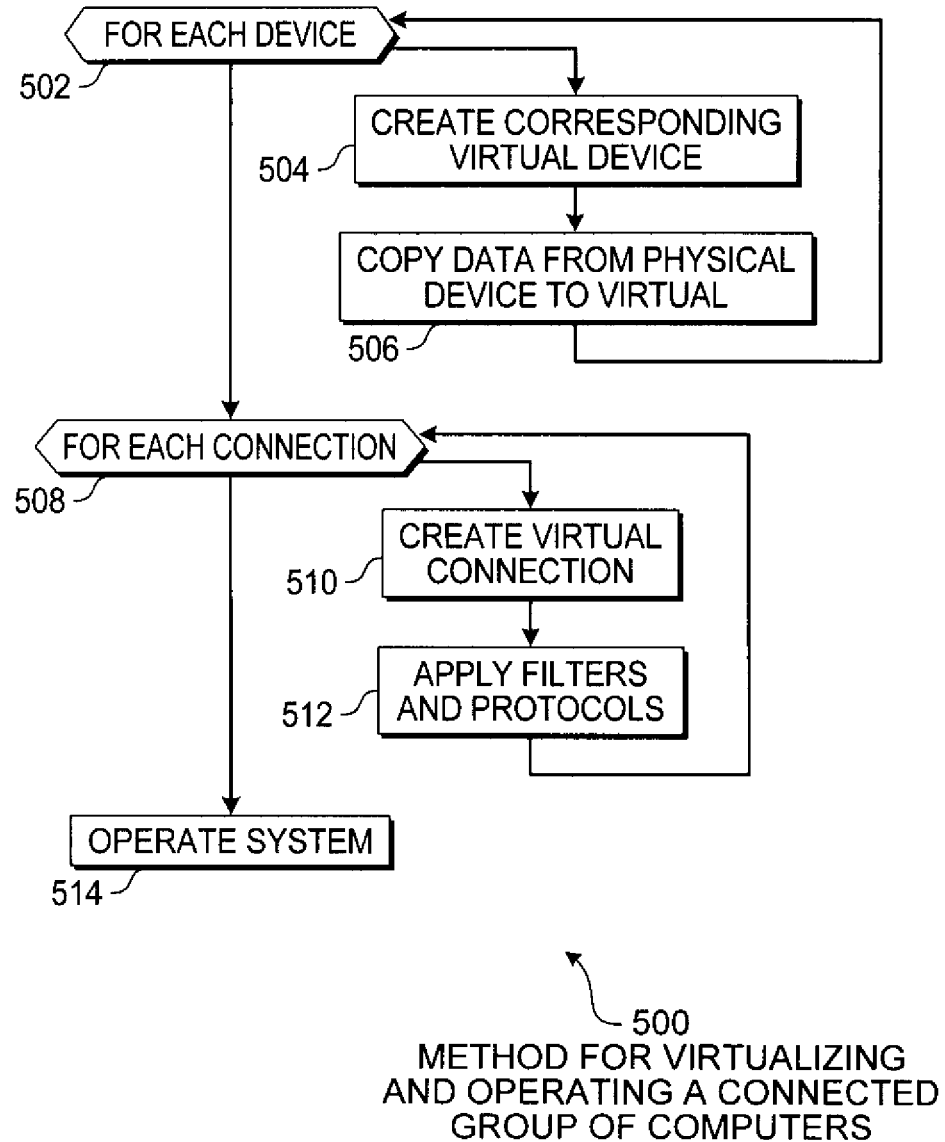
FIG. 5 is a flowchart illustration of an embodiment showing a method for creating a connected group of virtual devices.

FIG. 5 is a flowchart illustration of an embodiment 500 showing a method for creating a group of connected virtual devices that may represent a group of connected physical devices.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 may illustrate how a definition of a connected group of physical devices may be used to create a virtual representation of the group. For each device in block 502, a corresponding virtual device may be created in block 504 and data from the corresponding physical device may be copied to the virtual device in block 506.

Similarly, for each connection in block 508, a virtual connection may be created in block 510, and various filters and protocols may be applied to the connection in block 512. When the devices and connections are complete, the system may be operated in block 514.

When a virtual version of a physical device is created, some embodiments may communicate with the physical device and replicate various characteristics of the physical device within the virtual device. Also, various software components, settings, and data may be copied, replicated, or transferred to the virtual device.

In cases where an optimization or configuration change is implemented in a virtual version of a physical device or group of devices, the virtual device may contain components or functionality from several physical devices. In such cases, the data, software, and other components of two or more physical devices may be transferred to the corresponding virtual device.

In many cases where such an optimization may be performed, a template for an optimized version of a group of connected physical devices may be used to create a new virtual object and identify which components from different physical devices may be implemented in the virtual device.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
    monitoring a computer device to determine aspects of said computer device and to identify connections to other devices from both incoming messages sent to said computer device and outgoing messages sent from said computing device;
    collecting device data about one or more other devices from monitoring said computer device;
    determining one or more physical connection paths between said computer device and said one or more other devices from monitoring said computer device, each physical connection path including one or more physical connections between said computer device and said one or more other devices, at least one physical connection path also including a physical connection between one of the one or more other devices and another of the one or more other devices;
    for each of said one or more physical connection paths, collecting connection data about said one or more physical connections from monitoring said computer device;
    optimizing an arrangement of said one or more devices and said one or more physical connection paths for virtualization;
    for each of said one or more other devices, creating a virtual device corresponding to said device using said collected device data;
    for each of said one or more connection paths, creating a virtual connection corresponding to said physical connection path using said collected connection data, at least one virtual connection created from combining portions of collected connection data for a plurality of different physical connections;
    forming a group of virtual devices from the created virtual devices and created virtual connections;
    optimizing said group of virtual devices in accordance with one or more optimization templates; and
    operating said connected group of virtual devices.

2. The method of claim 1 further comprising:
    identifying a second group of physical devices, said second group of physical devices being operable on a physical network; and
    integrating the second group of physical devices into the group of virtual devices.

3. The method of claim 2, said at least one physical device being a high uptime computer device.

4. The method of claim 2, said at least two of said physical devices being configured in a load balancing arrangement.

5. The method of claim 1, wherein monitoring said computer device comprises crawling a portion of a network.

6. The method of claim 1, wherein monitoring said computer device comprises analyzing a monitoring system.

7. The method of claim 1, wherein optimizing said group of virtual devices comprises reducing a number of physical connections between at least two devices.

8. The method of claim 1, wherein optimizing said group of virtual devices comprises removing at least one of said devices.

9. The method of claim 1, wherein optimizing said group of virtual devices comprises optimizing said group of virtual devices in response to user input.

10. The method of claim 1 further comprising:
    instrumenting said computer device with instrumentation to determine aspects of said computer device and to identify connections to other devices prior to monitoring said computer devices.

11. The method of claim 1, wherein monitoring a computer device comprises said instrumentation collecting metadata about said identified connections.

12. A virtualization system comprising:
    one or more processors;
    system memory;
    one or more computer storage devices having stored there one computer-executable instructions represent a discovery tool, a device virtualization tool, a connection virtualization tool, a device optimizer, and a virtual environment, wherein said discovery tool is configured to:
        monitor a computer device to determine aspects of said computer device and to identify connections to other devices from both incoming messages sent to said computer device and outgoing messages sent from said computing device;
        collect device data about one or more other devices from monitoring said computer device;
        determine one or more physical connection paths between said computer device and said one or more other devices from monitoring said computer device, each physical connection path including one or more physical connections between said computer device and said one or more other devices, at least one physical connection path also including a physical connection between one of the one or more other devices and another of the one or more other devices;
        for each of said one or more physical connection paths, collect connection data about said one or more physical connections from monitoring said computer device; and
        optimize an arrangement of said one or more devices and said one or more physical connection paths for virtualization prior to creating virtual devices and virtual connections
    wherein said device virtualization tool is configured to:
        for each of said one or more other devices, create a virtual device corresponding to said device using said collected device data;

wherein said connection virtualization tool is configured to
for each of said one or more connection paths, create a virtual connection corresponding to said physical connection path using said collected connection data, at least one virtual connection created from combining portions of collected connection data for a plurality of different physical connections;
wherein the virtual environment is configured to:
form a group of virtual devices from the created virtual devices and created virtual connections; and
operate said connected group of virtual devices; and
wherein said device optimizer is configured to:
optimize said group of virtual devices in accordance with one or more optimization templates.

13. The virtualization system of claim 12, wherein said group of virtual devices comprises a hybrid group of virtual devices where at least one device is not virtualized.

14. The virtualization system of claim 12, said group of virtualized devices comprising a representation of protocols transferred using said connections.

15. The virtualization system of claim 12, said discovery tool configured to determine at least a portion of said connected group of devices from a configuration management tool.

16. A method for forming a group of virtualized devices, the method comprising:
identifying a first group of computer devices and collecting information about said first group of computer devices, said first group comprising physical devices connected by a first group of connections, and collecting information about said first group of connections;
analyzing device information collected about said first group of computer devices to determine an optimized group of computer devices;
analyzing connection information collected about said first group of computer devices, information collected about said first group of connections, and said optimized group of computer devices to determine an optimized group of connections;
forming an optimized physical arrangement of physical devices and connections from said analyzed device information and said analyzed connection information prior to virtualizing any devices or connections;
for each computer device in said optimized physical arrangement, creating a virtual device corresponding to said computer device using said information collected about said first group of computer devices;
for each connection in said optimized physical arrangement, creating a virtual connection corresponding to said physical connection using said information collected about said first group of connections, and wherein each said virtual device and each said virtual connection are combined to form an optimized group of virtual devices; and
forming an optimized group of virtual devices by optimizing any virtual devices and virtual connections created from the optimized physical arrangement in accordance with one or more optimization templates; and
operating said optimized group of virtual devices.

17. The method of claim 16, said identifying comprising crawling a portion of a computer network.

* * * * *